Feb. 11, 1947. M. B. WROBLEY 2,415,549
EGG GRADER
Filed Oct. 7, 1944 3 Sheets-Sheet 2
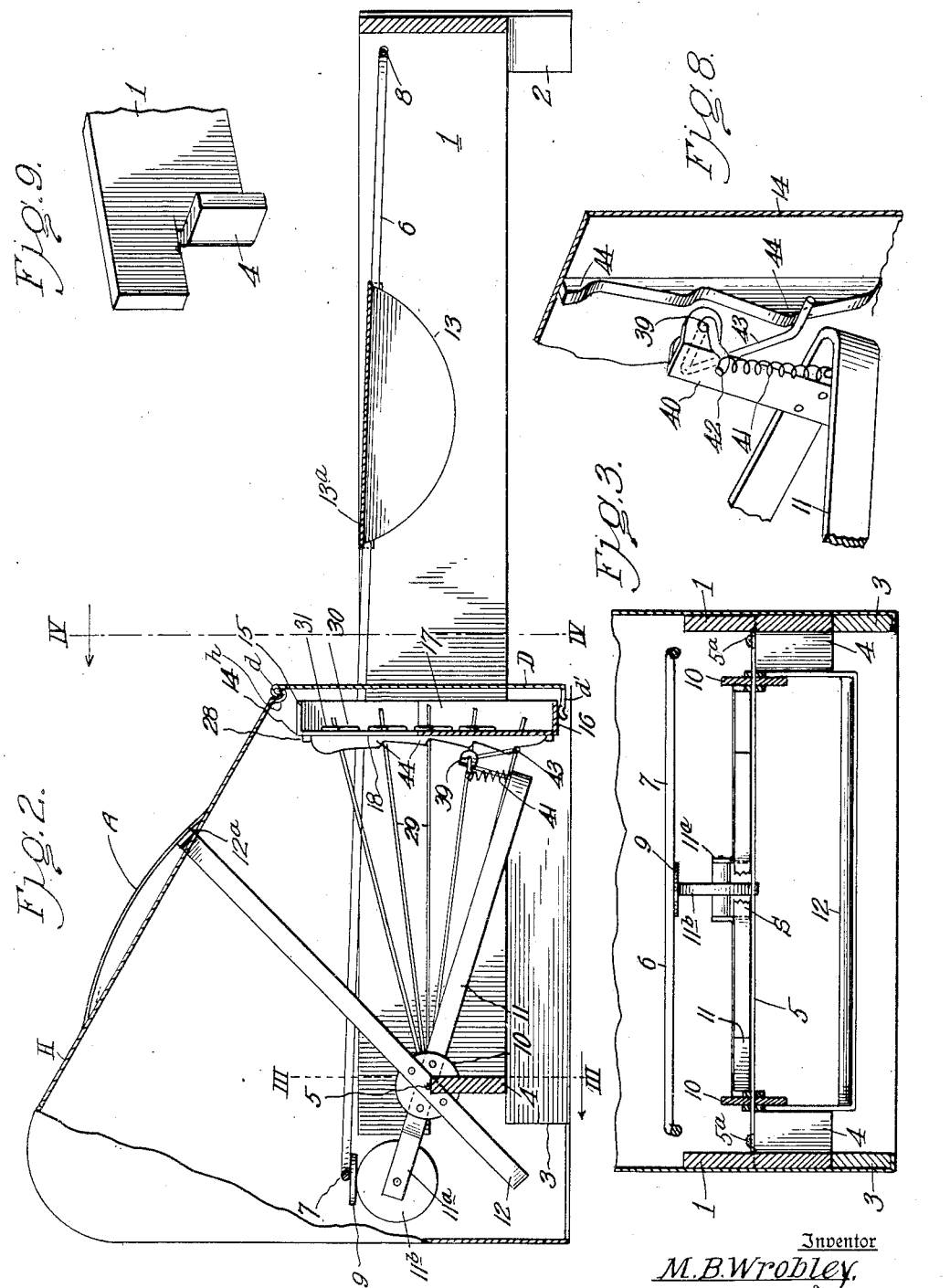
Inventor
M. B. Wrobley
By George F. Thorpe
Attorney Feb. 11, 1947. M. B. WROBLEY 2,415,549
EGG GRADER
Filed Oct. 7, 1944 3 Sheets-Sheet 3
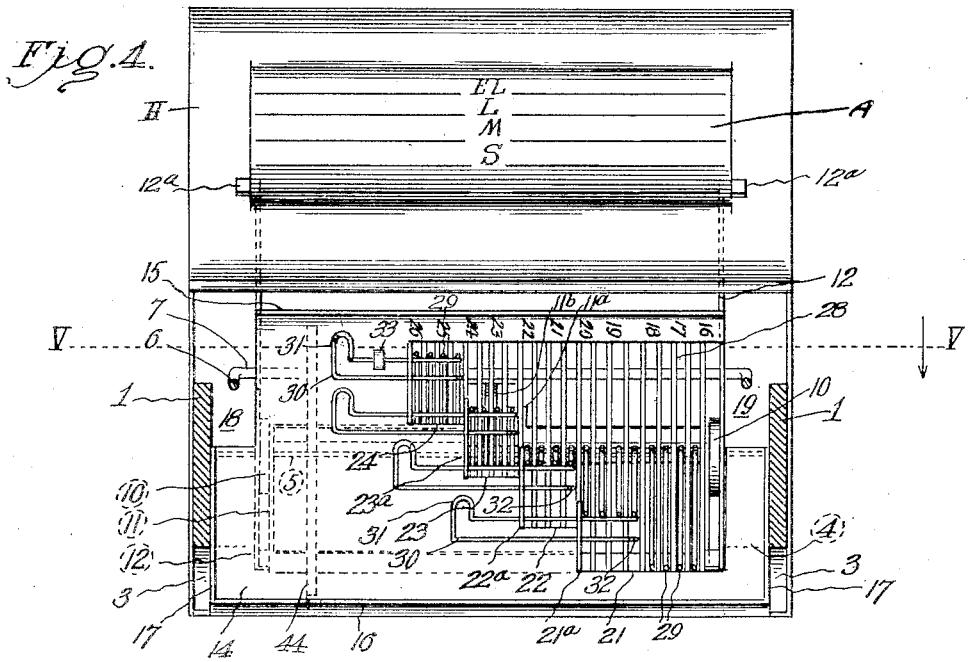
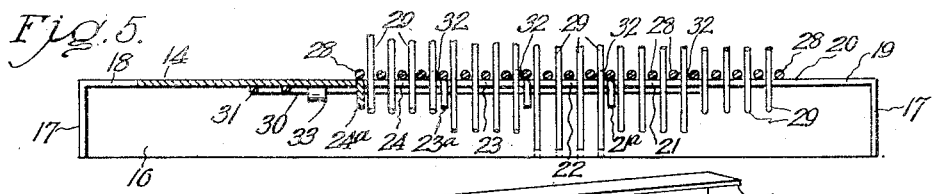
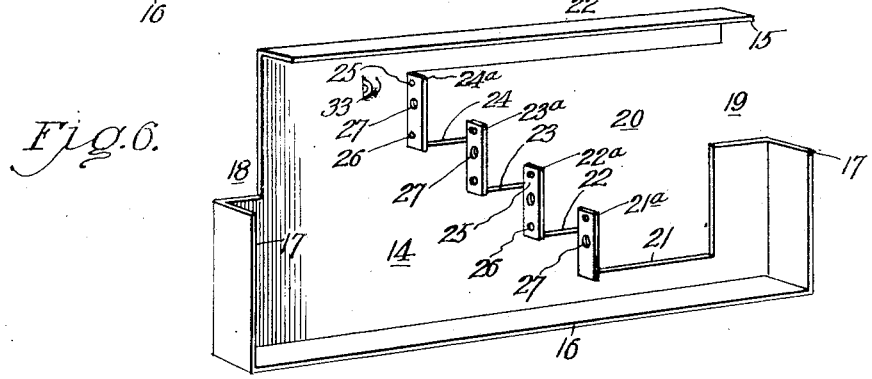
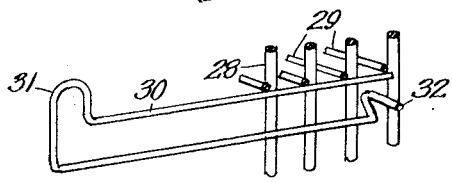
Inventor
M. B. Wrobley
By George J. Thorpe
Attorney Patented Feb. 11, 1947

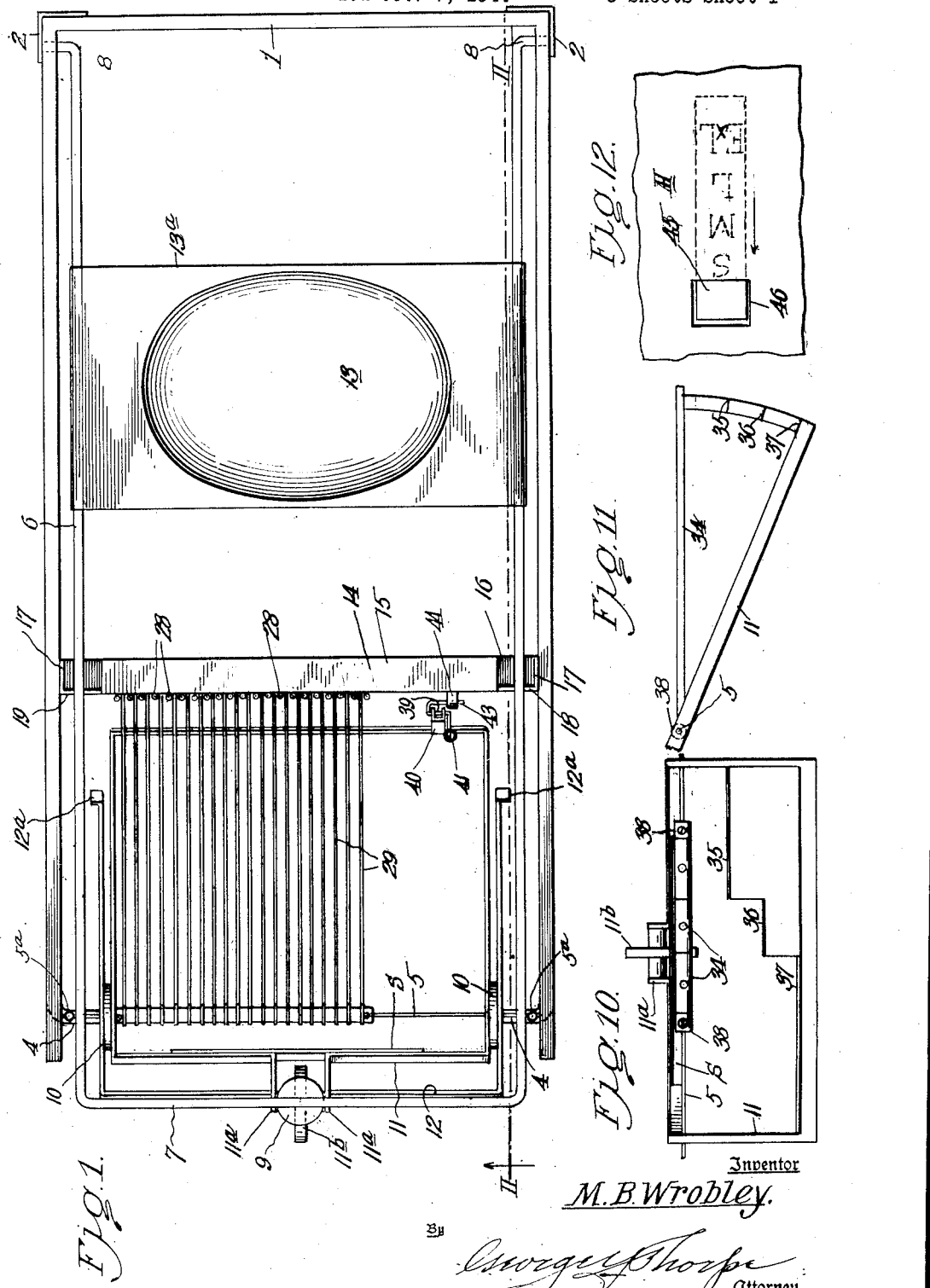

2,415,549

UNITED STATES PATENT OFFICE 2,415,549

EGG GRADER

Matthew B. Wrobley, Kansas City, Mo.

Application October 7, 1944, Serial No. 557,694

17 Claims. (Cl. 265—48)

This invention relates to egg graders of that class designed for indicating the grade of each egg supplied, regardless of whether it is a so-called commercial or non-commercial size.

So-called commercial eggs are usually comprised in four classes or grades, to wit: small, medium, large and extra large. In graders of the class under consideration it is conventional for the grade indicator mechanism to normally or initially disclose a grade station representative of non-commercial eggs, and under the weight of such an egg cannot operate to indicate a grade station representative of a commercial egg, but under the weight of a commercial egg of the lowest grade, such for example, which per dozen weigh from sixteen to eighteen ounces, the indicator mechanism will disclose the related or low grade commercial egg station, and likewise under the weights of eggs of progressively higher grades, will indicate or disclose the corresponding or related stations.

In all graders of which I have knowledge, levers of the first order are adapted for operation by any commercial grade egg placed upon them, but in such graders a large ratio, such as 1 to 10 or 1 to 12, of movement between that of the egg and that of the lever-balancing means or resistance, is impractical because the force or power ends of the levers would be too long and bulky, an important reason being that the lever arm supporting the egg must be from two to three inches long to compensate for variations in the position of the egg in the egg cup or holder of the lever. A short egg-receiving arm would be too restricted or limited for accurate grading. As a means of minimizing or preventing oscillations of the movable arm of the indicator mechanism, it is desirable to have a large ratio, such as above referred to, between the movement of the egg and that of the lever-balancing means, and I have found possible to secure such result in a small and compact grader, by using a compound leverage system, in which, specifically in the design of this application, the egg-carrying lever is of the second order and the lever-balancing means constitutes a lever of the first order. By such arrangement, the necessary length of the egg-load arm may have a short or low ratio of movement as contrasted with a relatively high ratio of movement of the first-order lever or balancing means, and the design of such an egg grader also makes provision for the indicator mechanism to clearly display the grade stations in the line of vision of and within easy reading distance from the operator in supplying the eggs to the grader.

The important object of the invention is to produce a speedily and accurately registering egg grader of small, compact, durable and inexpensive construction, in which the grade of each egg is conspicuously and legibly displayed in the line of vision of the operator.

Another object is to produce an egg grader adapted for acommodating all egg-grading standards, that is grade standards in which the weight of eggs per dozen may be determined by government or local requirements.

With the above-mentioned objects in view, the invention consists in certain novel and useful features of construction and combinations of parts as hereinafter described and claimed; and in order that it may be fully understood, reference is to be had to the accompanying drawings, in which:

Figure 1 is a top plan view of an egg grader embodying the invention, the housing feature being omitted to clearly disclose certain underlying parts.

Figure 2 is a vertical longitudinal section taken on the line II—II of Figure 1, with the housing in position.

Figure 3 is a vertical cross section taken on the line III—III of Figure 2.

Figure 4 is a vertical cross section taken on the line IV—IV of Figure 2, the housing door being omitted.

Figure 5 is an enlarged horizontal section taken on the line V—V of Figure 4, to clearly disclose an upright plate and certain related parts.

Figure 6 is a perspective view of the cross plate.

Figure 7 is an enlarged perspective view of an adjustable slider of the type disclosed in operative positon in Figures 2, 4 and 5.

Figure 8 is an enlarged perspective view of parts of the egg-carrying lever balancing means and the cross plate, and also a restrainer mechanism for preventing overrunning of parts of the grade-indicating mechanism.

Figure 9 is a fragment in perspective, of one end of an arm of the support or framework for the grader.

Figure 10 is a schematic view in front elevation, of a modified form of the egg-carrying lever-balancing means, and of the group of egg-balancing weights or rods.

Figure 11 is a side elevation of the construction appearing in Figure 10.

Figure 12 a view of an alternative arrangement for the indicator mechanism of certain preceding views.

Referring now to the construction of the grader as shown by the drawings, in which identical parts in the various views are identified by the same reference characters, 1 indicates a horizontal U-shaped framework or support, provided with front corner legs 2, and rear supports 3 which are preferably a part of the housing hereinafter described, and underlie the side arms of the support at the rear ends thereof. The sides of the support are preferably resilient and susceptible of being sprung inward, and the rear extremities are preferably formed with inturned arms 4, in transverse alinement for the convenient attachment thereto of a cross shaft 5, preferably of fine or small gauge non-corrosive wire. In assembling the shaft, the sides of the support are sprung inward at their rear ends and retained in such condition until the shaft is placed upon the inturned arms 4 and firmly secured thereto by soldering as at 5a, or in any other suitable manner. The removal of the stress on the support permits its sides to react and impose tensile strain on the shaft sufficient to prevent sagging thereof under the weight of parts hereinafter identified, for which it forms a pivotal support.

A wire lever 6, of small gauge and slightly resilient, by preference, is of U-form and disposed approximately horizontal. It is narrower than the support and its rear or closed end 7, is rearward of the cross shaft. At the front end the sides or arms of the lever terminate in outturned pivots or trunnions 8, suitably engaging the sides of the support. The closed or rear end of the lever is preferably equipped with an underlying plate 9.

Rotatably mounted on shaft 5, between the inturned arms 4 of the support, is a pair of spaced disks 10, and secured to opposite sides of said disks are the sides of a rectangular rock-frame 11, and a U-shaped indicator element 12. The rock-frame is balanced in opposition to the lever 6, and by preference, the said indicator element is in balanced relation with the shaft, and while movable with the rock-frame, preferably does not cooperate therewith in balancing the lever. The indicator arms or sides diverge upward and forward with respect to the rock-frame, and the upper ends of said arms terminate in outturned ends 12a. The housing element of the grade indicating mechanism, is identified by the character H and is made of thin resilient material so as to be capable of being fitted in or removed from position easily and quickly. The top of the housing stands well above the lever and slopes upward and rearward at an angle approximately at right angles to a line running from the eye of a person standing at the front end of the grader. About midway the length of the top it is formed with a transverse arch A, contoured to conform with the swing or arc of the ends 12a, of indicator arms 12, which project up through the opening provided in the top by the arched portion thereof, with their outer ends 12a overlying the top at the ends of the arch so as to be clearly visible to the operator. The arched portion bears the names or symbols of the grading stations, to wit: S, M, L and ExL representative respectively of small, medium, large and extra large eggs, said symbols being arranged in the order named from front to rear, about midway the width of the housing, and extending crosswise of the latter in alinement with the respective symbols, are lines with which the ends 12a of the indicator arms 12, are adapted to register. Normally, as when the lever bears a non-commercial egg, the ends 12a register with a cross line on the arch, forward of the line representative of the small egg station. The front end of the top of the housing terminates in an upturned hook h, for engagement by the hooked upper end d, of a door D, pendent between the sides of the lever 6, and provided at its lower end with a resilient catch d', for snap frictional engagement with the lower flange of a plate hereinafter described. The door is removable to give easy access to parts rearward thereof.

The lever-balancing rock-frame is journaled at an intermediate point in the length of its sides but in close proximity to its rear end, being proportioned as hereinbefore indicated, to bear a balanced relation to the lever 6. The rear end of the rock-frame is provided with spaced arms 11a, and a stiffening bridge strip s, and journaled on and between said arms is a roller 11b, underlying and in contact with the plate 9 of lever 6, for normally upholding the lever against operation when a non-commercial egg is placed on the latter in the egg cup or holder 13 of a cross plate 13a, secured to the lever.

Between the egg cup and the rock-frame rearward of the door D, is an upright cross plate 14, having top and bottom stiffening flanges 15 and 16 respectively, and side flanges 17 secured to the support 1. At opposite upper corners, said plate is provided with openings or notches 18 and 19, through which the sides of the lever 6 extend and have vertical play. The notch or opening 19 opens into a large opening 20 formed at its lower end to provide a series of steps. Including the base as a step, there appear in this instance, four steps, 21, 22, 23 and 24, ascending in the order named from the right-hand side to the left-hand side, and from the respective risers of said steps, project forward vertical lugs 21a, 22a, 23a and 24a, the lugs of the three lower risers projecting substantially above the level of the next higher steps respectively. The lug 24a of the top step riser extends to the top of the opening 20, and each of the three upper lugs is provided with small top and bottom openings 25 and 26 close to the front of the plate 14, and an intermediate large opening 27. The bottom lug has a small top opening 25 and an intermediate large opening 27, but needs no opening at the lower end.

Secured to the rear side of plate 14 for the full width of opening 20, is a series of equi-spaced vertical rods 28 constituting a guiding grill or comb for a series of egg-balancing weights in the form of rods 29 spaced apart like rods 28, along the length of and pivotally mounted on shaft 5. The rods 29 project forward through alined spaces of the comb, being thus arranged to avoid lateral play and appreciable lateral distortion when swung upward by the rock-frame when the latter is operated by lever 6, under the weight of a commercial egg.

The balance rods are divided in the preferred construction of the grader, into five groups, each group normally consisting of a plurality of the rods or units, shown as four in this instance, but the number of such rods or units in any group or groups may be varied by augmentation from an adjacent group or groups, or the number of units in any group or groups may be diminished by reversing such procedure, such adjustments being obtained by proper shifting transversely of the grader, of a slider or sliders 30 for the normal support of the respective four top groups, the sliders being arranged at the front side of the plate 14.

Each slider is of resilient wire and in the form of a hump hairpin with the hump 31 at the closed end. The upper leg of each slider provides the normal support of a group of the rods or units 29, while the lower leg at its free end is provided with a V-bend or cam 32, for snapping into a space between teeth of the comb to hold the slider against accidental slippage. The upper leg of each slider except the topmost one, extends through alined openings 25 and 26 of adjacent step riser lugs, and the lower leg through the large opening 27 of one of the pair of lugs, the latter opening accommodating sufficient springing of said lower leg to withdraw the V-end or cam from between adjacent comb teeth, preliminary to the adjustment of the slider for group augmentation or lessening purposes.

In the arrangement shown (Figures 4 and 5) each slider has support by two lugs except the top one, and to give proper support to the latter, the plate 14 has stamped forwardly, the guide loop or keeper 33, through which the upper leg of said slider extends. The sliders in main, fit flatly against plate 14, and the humps prevent rotatable movement around the upper legs as the axes, which might effect disengagement of the V-ends from the comb.

In the preferred form of the grader the egg-balance weights or rods constitute five groups radiating from shaft 5, at different angles as shown best by Figure 2, the group to be first lifted by the front end of the rock-frame, being responsive to the weight of an egg of the lowest commercial grade on the lever 6, said figure and Figure 4, showing that said group normally rests on the bottom step 21 of plate 14, in close proximity to the front underlying end of the rock-frame. The group of balance rods representative of the next lowest grade of commercial eggs—the medium size eggs—rests at the front end on the upper leg of the lowest slider, the remaining two groups of balance rods representative respectively of large and extra large commercial eggs, resting in the order mentioned on the upper legs of the second and third sliders reading upward. The said groups are adapted to be raised successively as encountered by the rock-frame, accordingly as the egg weighting the lever, corresponds to the grade of the group of the rods encountered by the rock-frame which, it will be noted swings upward at its front end a distance controlled by the extent of depression imparted to the lever by the egg in the cup. The plate 14 at the top of opening 20, limits the upward swing of rods 29 in the weighing of extra large eggs. The topmost group of the rods 29 occupies a radial plane corresponding substantially to that to which the next highest or fourth group of the rods is raised when the lever is operated by an egg belonging to the extra large grade. The topmost group is not designed to be lifted, being a reserve or storage group, so that one or more of its rods may be transferred to and form a part of the adjacent or extra large grade group and thus augment the resistance offered thereby to movement by the rock-frame, this transfer being desirable in the event the extra large group should comprise or include eggs weighing for example, twenty-six ounces per dozen instead of twenty-five ounces per dozen. To transfer a rod or rods from the reserve group to the adjacent group as suggested, the topmost slider is withdrawn to the left the requisite distance, the lower leg 32 springing out to permit such shifting of the slider and then snapping back between another pair of the comb rods or teeth, to secure the slider in the new position. In the event it is desired to perform a like operation with respect to the "large" group, the corresponding or third from bottom slider may be withdrawn to permit one or more of its balance rods to drop down and form a part of the group representative of eggs of the "medium" grade. The explanation regarding the augmentation or reduction of the number of balance rods comprising a group applies of course to the other groups representative of medium and small grade eggs. By the arrangement described, it will be apparent that a stepped relation is established between the groups of rods and the underlying or front portion of the rock-frame, and that the same relation is established and the same mode of operation is followed with the schematic showing of Figures 10 and 11, where the rods 34 appear in the same radial plane, but the front end of the rock-frame is in the form of a series of steps, one step in the vertical plane of each of the single rods, which as shown may number only three, which steps respectively, according to grade, are identified by the reference characters 35, 36 and 37, corresponding to the "medium," "large" and "extra large" grades. The "small" grade balancing means may be the rock-frame itself instead of using a balance rod for such purpose. The three rod arrangement is disclosed by Figures 10 and 11. It is obvious of course that the rods 34 may be disposed in different radial planes as in Figure 2, and that the rock-frame may correspond in construction to rock-frame 11 of the preferred construction, that is bear a stepped relation to the rods 34. The principle of construction is the same. The three rod type is very suitable for use in a grader which has definite or fixed grade limits. In the type of construction utilizing stiff and relative heavy rods, as 34, proper spacing is necessary. As shown the rear ends of the rods where pivoted on shaft 5, have wide endwise abutting bearings flanked by collars 38 secured on the shaft. The arrangement described guards against lateral shifting of the rods, and the latter being relatively stiff need no guiding grill or comb.

The plate 14 above the opening 20, bears a scale of numbers running from sixteen through twenty-six (Figure 4). With the slider adjustment as shown, numbers sixteen through eighteen relate to eggs weighing over sixteen to eighteen ounces per dozen, and appear above the group of egg balance rods responsive to the weight of an egg weighing over sixteen to eighteen ounces per dozen. The same is true of the remaining groups of balance rods representative of medium, large and extra large eggs weighing nineteen or twenty, twenty-one or twenty-two, twenty-three or twenty-four and twenty-five or more ounces per dozen, the sets of numbers appearing above the balance rods responsive to eggs of the different weights per dozen indicated. The use of the scale facilitates adjustment of the sliders and reduces the chance of error in making such adjustments.

As a means of preventing overrunning by the movable element of the grade station indicating mechanism, when weighing an egg closely related to two adjoining grades, I have provided a restraining mechanism comprising a spring-advanced element and a cam bar, the former being in the form of a crank-shaft 39 journaled in an arm 40 of the rock-frame. A relatively weak spring 41 connects an arm 42 of the said shaft to the rock-frame and holds the other arm 43 of the shaft to ride successively over the series of cams 44 of the cam bar in fixed relation to the plate 14. There is a cam for eggs of each commercial grade, and crank arm 43 by encounter with the cam for such grade, will have a restraining effect on the movable grade station indicating element, to prevent it from coming to rest between adjacent grading station symbols. As an alternative type of grade indicating mechanism, a plate 45 (Figure 12) bearing the grading station symbols in reverse order, is carried at the upper ends of arms 12, for swinging with the latter back and forth under and in close proximity to the top of the housing past a window 46 thereof, through which the station symbols of plate 45 may be observed.

As the function and operation of the various parts of the grader have been explained in connection with the description of the construction thereof, no general recapitulation of the operation is necessary other than to call attention to the fact that the use of a lever such as lever 6, has been found advantageous as the deposit of an egg thereon causes a slight deflection and sets up slight oscillations or vibrations which tend to increase the sensitivity of the grader over the use of a non-resilient lever.

While I have illustrated and described in Figures 1 through 9, the preferred construction of the grader, it is to be understood that I reserve the right to changes or modifications falling within the principle of construction involved and the spirit and scope of the appended claims, wherein the terms of non-commercial and commercial egg weights bear no reference to any particular weights.

I claim:

1. An egg grader comprising a support, a lever bearing an egg cup, mounted on the support, means pivotally mounted with respect to said support eccentrically of the axis of the lever and normally holding the latter and a non-commercial egg in balanced position, egg-grading station-indicating means operable different distances by said lever-balancing means when the latter is overbalanced different distances by said lever by different weights of commercial eggs, and yieldable restraining means for arresting the egg-grading station-indicating means at the lower value station of two adjacent stations, when the lever is operated by an egg of weight intermediate the weight of eggs representative of the two adjacent egg-grading stations.

2. An egg grader comprising a support, a lever mounted for receiving eggs to be graded, a plurality of egg-balancing weights arranged for successive lifting and representative of weight increments of succeeding grades of commercial eggs, oscillatory means operable by said lever and overbalancing any non-commercial egg and adapted for successively lifting all of the weights representative of the highest grade eggs, or any or all of the weights representative of a lower grade or grades of eggs, egg-grading station-indicating means operable different distances by said lever-balancing means when the latter is overbalanced different distances by said lever under eggs of different weight, and yieldable restraining means for arresting the egg-grading station-indicating means at the lower value station of two adjacent stations, when the lever is operated by an egg of weight intermediate the weight of eggs representative of the two adjacent egg-grading stations.

3. An egg grader comprising a support, a lever fulcrumed thereon for receiving the eggs to be graded, means pivoted eccentrically with respect to the axis of the lever, for holding the latter inoperative under the weight of an egg of non-commercial grade, groups of weights operable as a whole by the lever-upholding means under the weight of an egg of the highest grade, and operable in part by the said upholding means under the weight on the lever of an egg of the lowest or an intermediate commercial grade, the weights being stepped in relation to said upholding means, for successive engagement and operation by the latter, the steps or distances between the lever-upholding means and the groups of weights representative of different grades of commercial eggs, increasing from the weights representative of the lowest to the highest grade, a grading station for each grade of eggs, an indicator movable by the lever-upholding means for indicating the particular point of the grading station representative of the egg upon the lever, a bar having cam faces representative of eggs of different commercial grades below the highest grade, and spring-actuated means for engaging the cam face of the bar related to any particular grade of commercial egg upon the lever, to restrain the said indicator from overrunning the related station should the weight of the egg upon the lever lie between that represented by such cam and the cam representative of the next higher grade of egg.

4. An egg grader comprising a support, a cross shaft mounted upon the support, a lever bearing an egg cup, fulcrumed at one end on said support, with its axis disposed parallel with but eccentrically of the axis of said shaft, a rock-frame mounted on said shaft and at its rear end engaging the free end of said lever and normally upholding the same, a group of laterally-spaced shaft and disposed at their front ends above and parallel rods pivoted at their rear ends on said in stepped relation to the front end of said rock-frame, the rods of said group respectively serving as balance rods for weight increments of eggs of different grades imposed on said lever; the step between the rods and the rock-frame for the lowest grade commercial egg being the shortest and the steps increasing through the intermediate grades up to and including the highest grade, and egg-grading station-indicating means operable by said rock-frame.

5. An egg grader comprising a support, a lever of the second order mounted on the support for up and down movement and provided with an egg cup, a cross shaft mounted in the support below and adjacent the rear or free end of the lever, a rock-frame mounted on said shaft for vertical oscillation, and rearward thereof, engaging the rear or free end of said lever as a balancing support therefor, independent egg balancing weights for different increments of weights of grades of eggs operable successively by said rock-frame, and egg-grade indicating means comprising a stationary member and a member movable with the rock-frame.

6. An egg grader comprising a support, a lever of the second order mounted on the support for operation in a vertical plane and provided with an egg cup, a cross shaft mounted in the frame support below and adjacent the rear or free end of the lever, a rock-frame mounted on said shaft for vertical oscillation, and rearward of said shaft engaging the rear end of the said lever as a balancing support therefor, groups of egg-balancing rods pivoted on said shaft with their front or free ends above and in different stepped relation to the front end of the rock-frame; said groups of rods being adapted to be successively swung upward by the rock-frame, beginning with the group in closest proximity to the rock-frame when the same occupies its inoperative or rest position, and egg-grade indicating means operable by the rock-frame for visually displaying the grade of any egg in the egg cup.

7. An egg grader characterized as in claim 6, and provided with a fixed plate having a vertical comb through the interstices of which the said balancing rods project, and with an opening spanned by said comb and of step form at the bottom, the bottom step normally supporting the group of rods representative of eggs of the lowest grade classification, a reserve group of said rods adjacent the group representative of the highest grade eggs, and adjustable means carried by said plate for all the groups of rods except those related to the lowest grade of eggs, and engaging the comb to prevent accidental movement relative to the comb.

8. An egg grader characterized as in claim 6, and provided with a scale marking in vertical alinement with the groups of egg-balancing rods respectively related to such marking, the marking indicating the weights per dozen of the eggs related to the respective groups of said rods.

9. An egg grader comprising a support, a stationary housing forming a member of an egg-grading series of grade-indicating stations, a lever for receiving each egg to be graded, means pivoted eccentrically of the axis of the lever for holding the latter in balanced position under the weight of a non-commercial egg, a group of weights to be lifted as a whole by said means when the lever is operated by an egg of the highest grade, and to be lifted in part by said means when the lever is operated by a commercial egg of lower grade respectively, a second member of the grade-indicating mechanism movable only with the lever-balancing means for cooperation with the housing member for indicating a grading station corresponding to the grade of the egg imposed on said lever, a fixed bar, and spring-actuated means carried by the lever-balancing means for engaging said bar to prevent overrunning by the station-indicating member in the event an egg upon the lever is over weight relative to a particular station but underweight as regards the next higher station.

10. An egg grader comprising a support, a stationary housing forming a member of an egg-grading series of grade-indicating stations, a lever for receiving each egg to be graded, means pivoted eccentrically of the axis of the lever for holding the latter in balanced position under the weight of a non-commercial egg, a group of weights to be lifted as a whole by said means when the lever is operated by an egg of the highest grade, and to be lifted in part by said means when the lever is operated by a commercial egg of lower grade respectively, a second member of the grade-indicating mechanism movable only with the lever-balancing means for cooperation with the housing member for indicating a grading station corresponding to the grade of the egg imposed on said lever, the egg grader including a plurality of units as weights, and means adjustable for supporting units at different elevations to augment or lessen the weight of any group of units.

11. An egg grader comprising a support, a stationary housing forming a member of an egg-grading series of grade-indicating stations, a lever for receiving each egg to be graded, means pivoted eccentrically of the axis of the lever for holding the latter in balanced position under the weight of a non-commercial egg, a group of weights to be lifted as a whole by said means when the lever is operated by an egg of the highest grade, and to be lifted in part by said means when the lever is operated by a commercial egg of lower grade respectively, a second member of the grade-indicating mechanism movable only with the lever-balancing means for cooperation with the housing member for indicating a grading station corresponding to the grade of the egg imposed on said lever, the grader having a vertical comb, the weights being composed of a plurality of laterally-spaced units extending through said comb, and laterally-adjustable means for the support of the units.

12. An egg grader comprising a support, a lever mounted for receiving eggs to be graded, a plurality of egg-balancing weights arranged for successive lifting and representative of weight increments of succeeding grades of commercial eggs, oscillatory means operable by said lever and overbalancing any non-commercial egg and adapted for successively lifting all of the weights representative of the highest grade eggs, or any or all of the weights representative of a lower grade or grades of eggs, egg-grading station-indicating means operable different distances by said lever-balancing means when the latter is overbalanced different distances by said lever under eggs of different weight, a cam bar, and means for yieldingly engaging the cam bar for opposing overrunning of the movable member of the grade-indicating mechanism under the weight on the lever of an egg on the border line between two grades of eggs.

13. An egg grader comprising a support, a vertically-oscillatory lever mounted thereon for receiving eggs to be graded, the lever being of U form of small gauge resilient wire, means for balancing said lever under the weight of an egg upon it of less than a commercial grade egg, a plurality of egg-balancing vertically oscillatory weights adapted to be successively lifted by said lever-balancing means, one weight or a plurality of or all of the weights being lifted accordingly as an egg of the lowest grade, an intermediate grade or of the highest grade is imposed on said lever, a visual grading station for all commercial grade eggs, an indicator movable by the lever-balancing means for indicating the particular point of the grading station representative of the egg upon the lever, a bar having cam faces representative of eggs of different commercial grades below the highest grade, and spring-actuated means carried by the lever-balancing means for engaging the cam face of the bar related to any particular grade of commercial egg upon the lever, to restrain the said indicator from overrunning the related station should the weight of the egg upon the lever lie between that represented by such cam and the cam representative of the next higher grade of egg.

14. An egg grader comprising a support, a stationary housing having symbols indicative of grading stations for non-commercial grade eggs and for eggs of progressively increasing commercial grades, the commercial egg grading stations beginning with the lowest grade and ending with the highest grade, a lever to receive each egg to be graded, the length of movement of the lever being determined by the grade of the egg imposed upon it, a rock frame for normally holding the lever in balanced position under the weight of a non-commercial egg, a group of weights for actuation by said rock frame for balancing the weight on the lever of an egg of the highest grade, in part for balancing the weight on the lever of a commercial grade egg of a lower grade respectively, and an element or member movable only with the rock frame for operation thereby for indicating in conjunction with the housing, the commercial egg-grading station symbol corresponding to the grade of the egg imposed on the lever, a cam bar, and means carried by the rock-frame for yieldingly engaging the cam bar for preventing overrunning of the indicator relative to the housing, in the event the weight of an egg on the lever lies between that represented by two adjacent stations of the housing.

15. As a new article of manufacture, an egg grader comprising a support, a U-shaped lever of the second order carried by the support, the arms of the lever being resilient, an egg cup between and suspended from said arms at an intermediate point in their length, and adapted to set up slight vertical vibratory movement to said arms upon receiving an egg, a rock-frame for vertical oscillation, underlying the free end of the lever and holding the same in balance until overcome by the weight of a commercial grade egg in said cup, an egg grade indicator station for eggs of different commercial grades, means whereby the lever under the weight of a commercial egg in the cup, shall operate said rock-frame, and means actuated by the operation of the rock-frame, for indicating the grading station at a point representative of the grade of the commercial egg in the cup.

16. An egg grader comprising a horizontal U-shaped support of which the arms are resilient and may under compression be caused to approach and when relieved of such compression will move apart, a horizontal cross wire shaft secured at its ends to the arms of the support and held under tensile strain by said arms in their tendency to move apart, a lever of the second order pivoted on the support and adapted for vertical oscillation, and a rock-frame pivoted on said shaft and rearward thereof underlying the free end of said lever, the rock-frame normally holding the lever against oscillation under a weight on the lever corresponding to that of a non-commercial egg.

17. An egg grader comprising a support, a lever pivoted on the support, an egg cup on the lever intermediate the length of the latter, a cross-shaft on the support, short of the rear or free end of the lever, a rock-frame on said shaft and rearward of the latter underlying and engaging said lever, a series of laterally-spaced weights pivoted on said shaft and extending over and in vertically-stepped relation to the front end of said rock-frame, a housing bearing grade-indicating stations for different grades of commercial eggs, a grade-station indicating means to register with any of the grade stations of the housing, and means actuated by the rock-frame for preventing the station-indicating means from overrunning the station related to the commercial egg on the lever, in the event such egg is over weight for that particular station.

MATTHEW B. WROBLEY.

REFERENCES CITED

The following references are of record in the file of this patent:

UNITED STATES PATENTS

| Number | Name | Date |
|---|---|---|
| 1,400,469 | Weine | Dec. 13, 1921 |
| 1,002,784 | Talbot | Sept. 5, 1911 |
| 1,507,326 | Schmidt | Sept. 2, 1924 |
| 327,530 | Cook | Oct. 6, 1885 |
| 447,691 | Lundberg | Mar. 3, 1891 |
| 1,499,153 | Chapman | June 24, 1924 |

FOREIGN PATENTS

| Number | Country | Date |
|---|---|---|
| 571,607 | German | Mar. 2, 1933 |
| 526,649 | German | June 8, 1931 |